(12) United States Patent
Knittel et al.

(10) Patent No.: US 7,876,482 B2
(45) Date of Patent: Jan. 25, 2011

(54) METHOD FOR WAVELENGTH MISMATCH COMPENSATION IN A HOLOGRAPHIC STORAGE SYSTEM

(75) Inventors: Joachim Knittel, Tuttlingen (DE); Frank Przygodda, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 857 days.

(21) Appl. No.: 11/786,345

(22) Filed: Apr. 10, 2007

(65) Prior Publication Data
US 2007/0242326 A1    Oct. 18, 2007

(30) Foreign Application Priority Data
Apr. 13, 2006    (EP) .................................. 06007810

(51) Int. Cl.
*G03H 1/22* (2006.01)
(52) U.S. Cl. ............................ 359/32; 359/35; 359/900
(58) Field of Classification Search .................. None
See application file for complete search history.

(56) References Cited

U.S. PATENT DOCUMENTS 5,438,439 A    8/1995    Mok et al.

2002/0061033 A1    5/2002    Kitaoka et al.
2003/0104285 A1    6/2003    Hirao et al.
2006/0171284 A1    8/2006    Matsumoto et al.
2006/0280210 A1    12/2006    Mizushima et al.

FOREIGN PATENT DOCUMENTS

| EP | 1511016 A2 | 5/2005 |
|---|---|---|
| EP | 0708181 A1 | 10/2006 |
| WO | WO 9702563 | 1/1997 |
| WO | WO 2005/036538 A1 | 4/2005 |

OTHER PUBLICATIONS

Search Report Dated Jan. 23, 2007.

*Primary Examiner*—Amel C Lavarias
*Assistant Examiner*—Derek S Chapel
(74) *Attorney, Agent, or Firm*—Robert D. Shedd; Harvey D. Fried; James McKenzie

(57) ABSTRACT

A method for compensating for a wavelength mismatch between a readout reference beam and a recording reference beam in a holographic storage system is described. In order to compensate for a wavelength mismatch in a first step the wavelength mismatch is determined. In a second step the direction of at least part of the readout reference beam is adjusted relative to a holographic storage medium in dependence on the determined wavelength mismatch by defocusing the readout reference beam or by adjusting the focal length of an objective lens for focusing the readout reference beam into the holographic storage medium.

8 Claims, 5 Drawing Sheets

METHOD FOR WAVELENGTH MISMATCH COMPENSATION IN A HOLOGRAPHIC STORAGE SYSTEM

This application claims the benefit, under 35 U.S.C. §119 of European Patent Application 06007810.2 filed Apr. 13, 2006.

FIELD OF THE INVENTION

The present invention relates to a method for compensating for a wavelength mismatch between a readout reference beam and a recording reference beam in a holographic storage system. The invention further relates to a holographic storage system implementing the method.

BACKGROUND OF THE INVENTION

One concept for increasing the capacity of optical storage media is to use holographic data storage. In this case the surface or the whole volume of the holographic storage medium is used for storing information, not just a few layers as for conventional optical storage media. Furthermore, instead of storing single bits, data are stored as data pages. Typically a data page consists of a matrix of light-dark-patterns, which code multiple bits. This allows to achieve increased data rates in addition to the increased storage density. One further advantage of holographic data storage is the possibility to store multiple data in the same volume, e.g. by changing the angle between the two beams or by using shift or wavelength multiplexing, etc.

In holographic data storage digital data are stored by recording the interference pattern produced by the superposition of two coherent laser beams, where one beam, the so-called 'object beam', is modulated by a spatial light modulator and carries the information to be recorded in the form of the data pages. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam. According to one holographic storage approach the reconstructed object beam is read in transmission (transmission type holographic storage medium). For this approach an optical system is needed on both sides of the holographic storage medium. A different approach is to read the reconstructed object beam in reflection (reflection type holographic storage medium). In this case only a single optical system is required. For this purpose the rear side of the holographic storage medium is coated with a mirror layer. The reconstructed object beam is reflected by this mirror layer and can be read from the same side as used for recording.

As the possibility of wavelength multiplexing already indicates, holographic storage systems are very sensitive to wavelength shifts. For an optimum readout performance, the reference beam should have the same wavelength during reading as the wavelength used during recording. However, when an holographic storage medium is to be read in a different storage system than the one used for recording, wavelength mismatches are likely to occur. In addition, due to ageing effects, temperature changes or the like, changes of the wavelength are even found in the same holographic storage system.

WO 2005/036538 discloses a holographic storage medium, in which a wavelength address hologram is recorded. The wavelength address hologram includes information about the wavelength used for recording. The wavelength address hologram can be used to determine a wavelength mismatch between a recording reference beam and a reading reference beam. However, no information is given on how to compensate for the mismatch.

To overcome the above problem, WO 97/02563 discloses a holographic storage system, which is capable of reading a hologram with a different wavelength than the wavelength used for recording. This is achieved by adjusting the angle of incidence of the reading reference beam relative to a holographic storage medium.

SUMMARY OF THE INVENTION

It is an object of the invention to propose a further method which at least partially compensates for wavelength shifts of the laser source in an optical holographic storage system. It is a further object of the invention to propose a holographic storage system, in which the compensation method is implemented.

According to the invention, this object is achieved by a method for compensating for a wavelength mismatch between a readout reference beam and a recording reference beam in a holographic storage system, having the steps of:
  determining the wavelength mismatch; and
  adjusting the direction of at least part of the readout reference beam relative to a holographic storage medium in dependence on the determined wavelength mismatch by defocusing the readout reference beam or by adjusting the focal length of the objective lens.

A holographic storage system implementing the compensation method has a light source for generating a readout reference beam, an objective lens for focusing the readout reference beam into a holographic storage medium, a wavelength mismatch determination unit, and a wavelength mismatch correction element for adjusting the direction of at least part of the readout reference beam relative to the holographic storage medium in dependence on the determined wavelength mismatch by defocusing the readout reference beam or by adjusting the focal length of the objective lens.

The solution has the advantage that the requirements regarding the wavelength stability of the laser source are reduced. This is especially advantageous, if the holographic storage medium is used with different holographic storage systems. The method is particularly interesting for collinear optical setups, because in this case the distortion of the readout data page on a detector is also reduced. The wavelength mismatch is preferably measured either statically once before reading is initiated, or dynamically during reading. Advantageously, information about the wavelength used for recording is stored on the holographic storage medium.

Preferably, the focal length of the objective lens is adjusted by an additional lens with a variable focal length, a telescope, or a diffractive optical element, which is placed in the beam path of the readout reference beam. In this way only a minimum of additional optical elements are necessary.

Instead of using an additional optical element for adjusting the focal length of the objective lens, it is likewise possible to use an objective lens having a variable focal length. In this case no additional optical element is needed in the beam path, which reduces cost and allows to minimize the optical setup.

Advantageously, the distance between the holographic storage medium and the objective lens is adjusted in accordance with the change of the focal length of the objective lens. This ensures that imaging aberrations on a detector for the reconstructed object beam are minimized.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
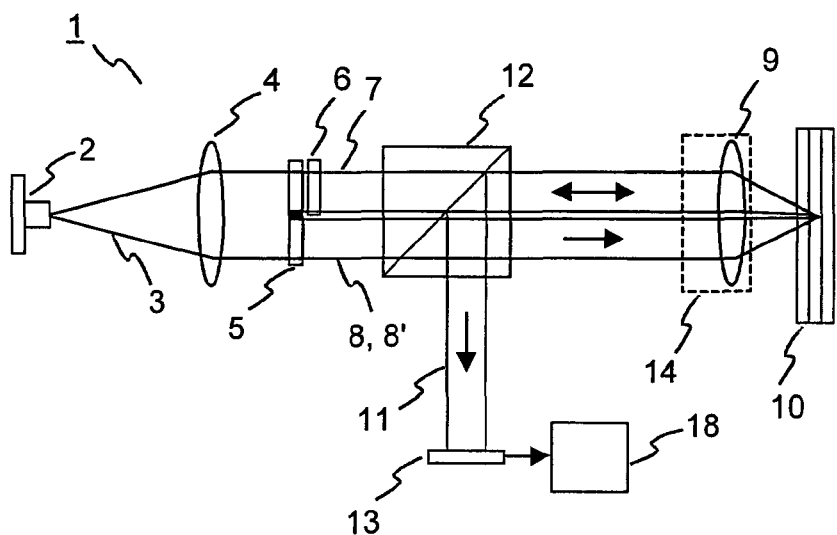
FIG. 1 schematically depicts a holographic pickup used in a holographic storage system.

In holographic data storage digital data are stored by recording the interference pattern produced by the superposition of two coherent laser beams. An exemplary setup of a holographic pickup 1 for use in a holographic storage system is shown in FIG. 1. A source of coherent light, e.g. a laser diode 2, emits a light beam 3, which is collimated by a collimating lens 4. The light beam 3 is then divided into two separate light beams 7, 8. In the example the division of the light beam 3 is achieved using a first beam splitter 5. However, it is likewise possible to use other optical components for this purpose. A spatial light modulator (SLM) 6 modulates one of the two beams, the so called "object beam" 7, to imprint a 2-dimensional data pattern. Both the object beam 7 and the further beam, the so called "recording reference beam" 8, are focused into a holographic storage medium 10, e.g. a holographic disk or card, by an objective lens 9. At the intersection of the object beam 7 and the recording reference beam 8 an interference pattern appears, which is recorded in a photosensitive layer of the holographic storage medium 10.

The stored data are retrieved from the holographic storage medium 10 by illuminating a recorded hologram with a readout reference beam 8' only. The readout reference beam 8' is diffracted by the hologram structure and produces a copy of the original object beam 7, the reconstructed object beam 11. This reconstructed object beam 11 is collimated by the objective lens 9 and directed onto a 2-dimensional array detector 13, e.g. a CCD-array, by a second beam splitter 12. The array detector 13 allows to reconstruct the recorded data. In order to compensate for wavelength deviations of the readout reference beam 8' in comparison to the recording reference beam 8', the holographic data storage system 1 includes a wavelength mismatch compensation element 14 and a wavelength mismatch determination unit 18. Advantageously, the wavelength mismatch determination unit 18 measures the wavelength of the readout reference beam 8' and compares this wavelength with information about the wavelength of the recording reference beam 8, which is recorded on the holographic storage medium 10. Of course, the wavelength mismatch determination unit 18 may also employ other methods for measuring the wavelength mismatch.

Figure 2:
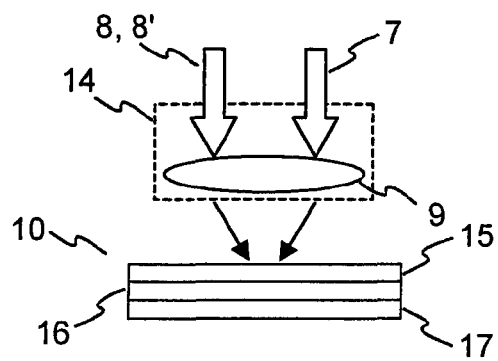
FIG. 2 depicts a further schematic view of the light beams impinging on the holographic storage medium, FIGS. 3a) and b) illustrate the positions of the reference beam and the object beam on the objective lens, FIGS. 4a) to c) schematically show a k-sphere representation of recording and reading with an uncorrected and a corrected wavelength mismatch, FIGS. 5a) and b) depict a k-sphere representation of angle-multiplexed recording and reading.

FIG. 2 shows a more detailed view of the exemplary holographic storage system with respect to the focusing of the recording reference beam 8 and the object beam 7 into the holographic storage medium 10 by the objective lens 9. The two beams 7, 8 interfere in, or close to, the Fourier plane of the objective lens 9 within a storage layer 16 of the holographic storage medium 10. During readout of the stored data the medium 10 is illuminated with a readout reference beam 8' only. The reconstructed object beam 11 passes through an optional buffer layer (not shown), is reflected by a mirror layer 17, passes trough the optional buffer layer, the storage layer 16 and a cover layer 15, and is collimated by the objective lens 9. The correction element 14 is preferentially located close to the objective lens 9. It is likewise possible that the objective lens 9 is part or the correction element 14. Preferably, the correction element 14 is a lens with a variable focal length, a telescope, a diffractive optical element, or the objective lens 9 itself.

Figure 3:
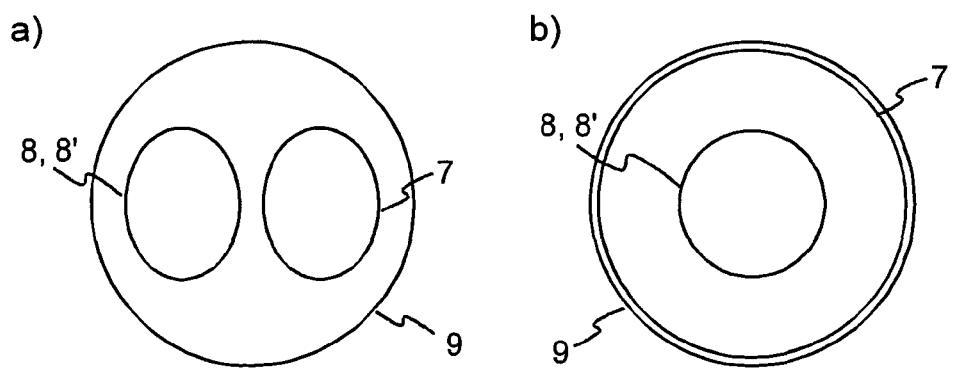

In FIG. 3 the positions of the (recording or readout) reference beam 8, 8' and the object beam 7 on the objective lens 9 are illustrated. FIG. 3a) shows the case of the exemplary holographic storage system 1 of FIGS. 1 and 2, whereas FIG. 3b) shows a case where the reference beam 8, 8' is located in a central circular region of the objective lens 9, while the object beam 7 is located in a surrounding ring-shaped region of the objective lens 9.

The diffraction efficiency of a volume hologram decreases when the hologram is read out with a wavelength that is different from the wavelength used during recording. At the same time the object beam quality is reduced with regard to optical aberrations. This situation is known as wavelength mismatch.

FIGS. 4a) to c) illustrate a k-sphere representation of the situation during recording with a wavelength $\lambda_1$ (FIG. 4a)), when reading with a longer wavelength $\lambda_2$ without correction (FIG. 4b)), and when reading with a longer wavelength $\lambda_2$ with correction (FIG. 4c)). It is to be noted that in figures the k-spheres have been normalized to a unit k-sphere. The object beam 7 and the reference beam 8 are considered as plane waves. During recording, the wave vectors $R_1$ (reference beam) and $S_1$ (object beam) generate a grating vector $G_1$. As can be seen in FIG. 4b), reading the grating structure with a wave vector $R_2$, which has a different wavelength (in this example a longer wavelength) leads to a Bragg mismatch B of a reconstructed object beam $S_2$. According to the invention, the direction of the wave vector $R_2$ is changed such that the resulting reconstructed object beam $S_2=R_2+G_1$ fulfills the Bragg equation and the Bragg mismatch is equal to zero. In this case the direction of the reconstructed object beam $S_2$ is also changed.

According to a first embodiment of the invention, the change of direction of the wave vector $R_2$ is achieved by modifying the focal length of the objective lens 9 according to the following equation:

$$f_2 = \frac{\lambda_1}{\lambda_2} f_1,$$

where $f_i$ is the effective focal length of the combination of correction element 14 and the objective lens 9. The subscripts 1 and 2 refer to the original wavelength $\lambda_1$ and the shifted wavelength $\lambda_2$. The modification of the focal length is preferentially achieved by an additional lens with a variable focal length, a telescope, or a diffractive optical element. It is likewise possible to use the lens with the variable focal length as the objective lens 9.

When the focal length is changed, the distance between the holographic storage medium 10 and the objective lens 9 is preferably also changed in such a way that the focal plane is situated on the reflective layer 17 of the holographic storage medium 10. This means that, if the focal length $f_1$ is changed to $f_2$, the distance between the objective lens 9 and the reflective layer 17 is also changed from $f_1$ to $f_2$.

Figure 4:
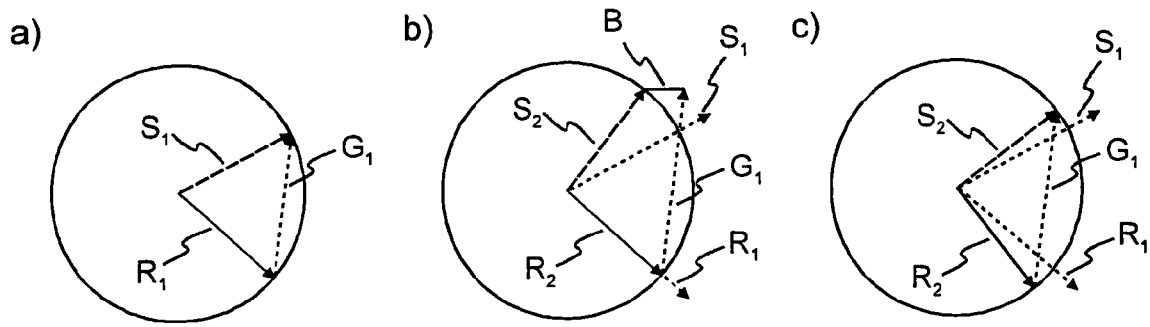

From the k-sphere diagrams illustrated in FIG. 4 the wavelength selectivity can easily be derived. The wavelength selectivity can be defined as the difference between the reading wavelength and the recording wavelength where the diffraction efficiency reaches its first zero. Theoretically this is the case when $$\Delta\lambda = \frac{\lambda_1^2 \cos\theta_s}{2L\sin^2(\theta_f + \theta_s)},$$

with $\Delta\lambda=\lambda_2-\lambda_1$, $\theta_s$ the angle of the (reconstructed) object beam, $\theta_f$ the angle of the reference beam and L the hologram thickness. For a hologram of thickness L=200 μm and angles $\theta_s$ and $\theta_f$ of 10°, this results for a recording wavelength of 400 nm in a selectivity of $\Delta\lambda=13$ nm.

Figure 5:
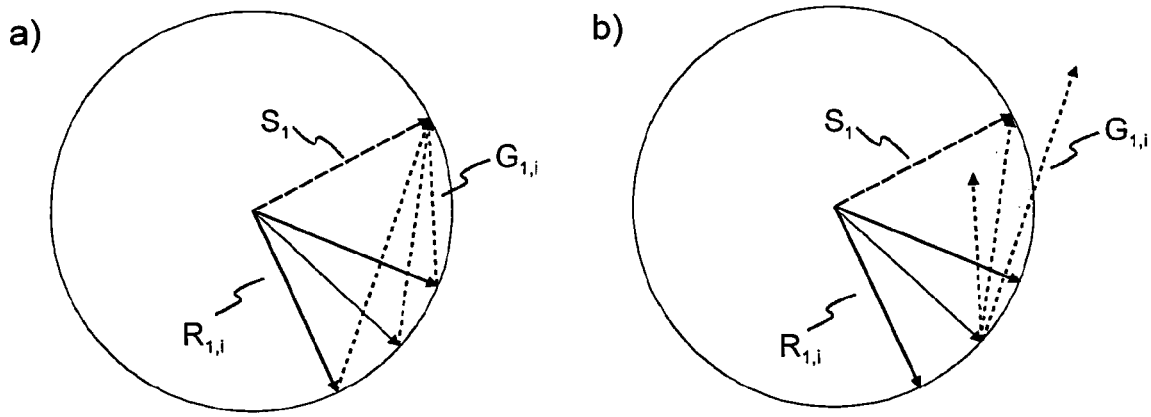

FIG. 5 illustrates the k-sphere diagrams for the case of a spherical recording reference beam 8, as used for example for shift multiplexing. The spherical recording reference beam 8 can be understood as a sum of plane waves with different angles. The diagram in FIG. 5a) shows three exemplary plane waves $R_{1,i}$ of this sum of plane waves. The resulting grating vectors are indicated by short dashed lines $G_{1,i}$.

When reading the hologram with the same wavelength each plane wave, e.g. the one which has recorded the 'central' grating vector, simultaneously reads all recorded grating vectors. However, due to the Bragg mismatch of all other gratings only the 'central' grating is read out with a high diffraction efficiency, as illustrated in FIG. 5b).

Figure 6:
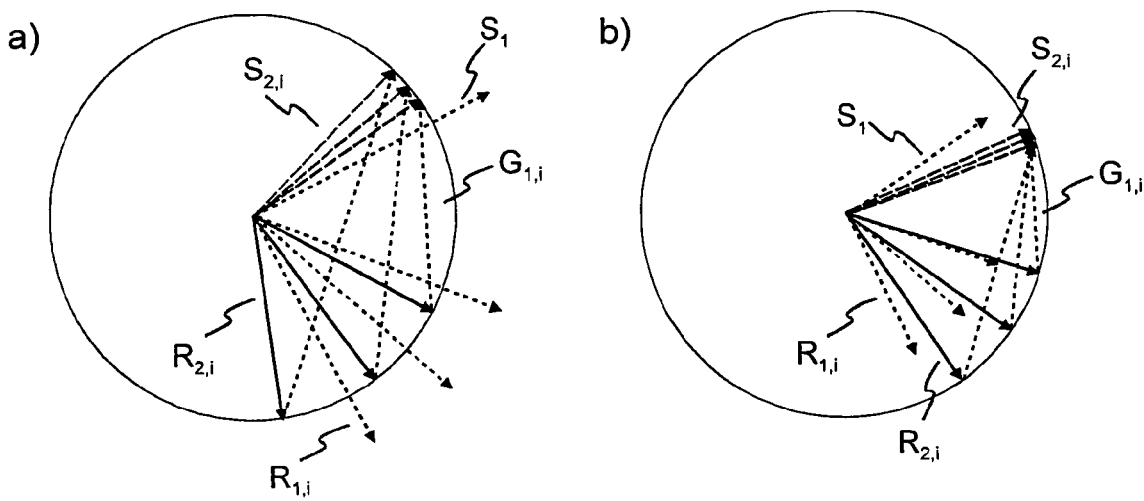
FIG. 6 depicts a k-sphere representation of angle-multiplexed reading with a wavelength mismatch.

The situation encountered in case of reading with a different wavelength is shown in FIG. 6. FIG. 6 a) shows the case of a longer wavelength $\lambda_2$, FIG. 6b) the case of a shorter wavelength $\lambda_2$. Since the readout reference beam 8' consists of different plane waves, there will be always one plane wave which fulfills the Bragg condition for one of the gratings. However, in contrast to the case of reading with the correct wavelength $\lambda_2=\lambda_1$, the reconstructed object beam 11 exhibits some deficiencies:

1. The angle of the reconstructed object beam 11 is different from the angle of the original object beam 7.
2. Since the grating vectors $G_{1,i}$ do not meet at the same point of the k-sphere, the reconstructed object beam 11 consists not only of a single plane wave, but of a set of plane waves with different angles. This results in an aberration of the reconstructed object beam 11. A more detailed discussion of this aspect will be given below.
3. Not all the gratings $G_{1,i}$ can be read with a different wavelength, as not all of the necessary reference beam angles are available. In FIG. 6 it can be seen that the fans of the reference beams $R_{2,i}$ of the second wavelength (solid lines) and the reference beams $R_{1,i}$ of the first wavelength do not overlap completely. Therefore the total diffraction efficiency is lower.

Figure 7:
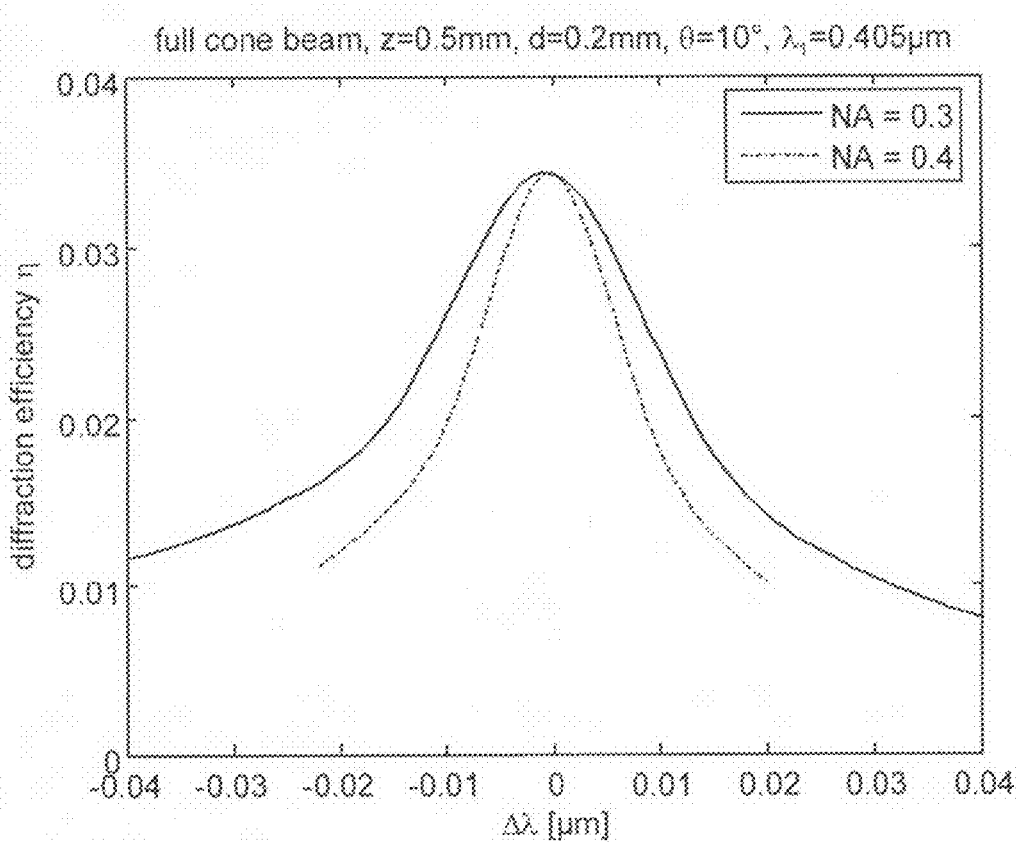
FIG. 7 shows the wavelength dependency of the diffraction efficiency, FIGS. 8a) to d) show the region of the diffraction peak for four different wavelength mismatches, FIGS. 9a) to d) depict the diffraction peaks of holograms read with a wavelength mismatch for different defocusing values.

FIG. 7 shows the wavelength dependency of the diffraction efficiency η (intensity of the reconstructed signal beam) obtained from beam propagation simulations for a setup with a spherical recording reference beam and readout reference beam. The underlying parameters are:

$\lambda_1$=405 nm n=1.5, Δn=0.00002 hologram thickness: d=200 μm distance of spherical wave origin from center of hologram: z=500 μm numerical aperture of readout reference beam: NA=0.30, 0.4 object beam angle (outside medium): θ=10°

As can be seen, a higher numerical aperture results in a higher wavelength selectivity.

Apart from the diffraction efficiency η it is also interesting to study the aberrations of the diffracted light. As discussed before, the reconstructed beam will differ from a plane wave if a wavelength mismatch is present. Therefore, the peak representing the signal beam of a single SLM pixel imaged on the detector will be distorted in case of a wavelength mismatch. This could have the negative effect of an increased crosstalk between neighboring pixels of the SLM imaged on the detector.

Figure 8:
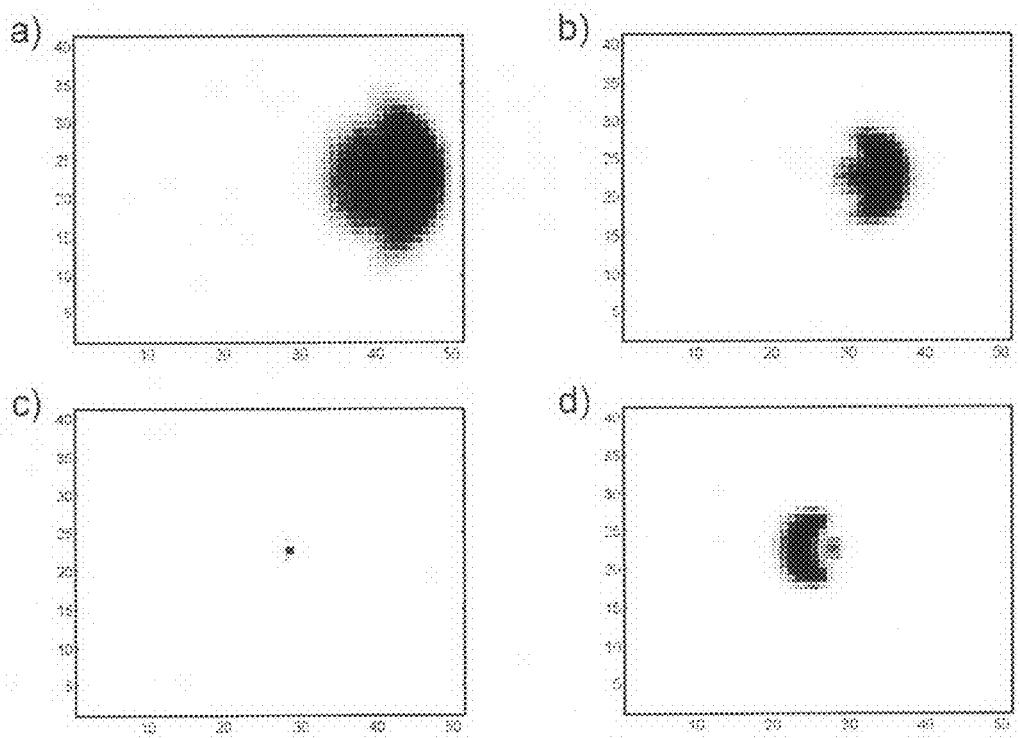

FIG. 8 shows the region of the diffraction peak for four different wavelength mismatches of Δλ=−50 nm (FIG. 8a)), Δλ=−25 nm (FIG. 8b)), Δλ=0 nm (FIG. 8c)), and Δλ=+20 nm (FIG. 8d)). The simulation is based on the parameters as in FIG. 7 with NA=0.3. As expected, the peak shows large distortions in case of large wavelength differences. The distortion of the beam could be more critical for reading the hologram than the lower diffraction efficiency, since the smearing of the peak occurs already at relatively small wavelength mismatches.

Figure 9:
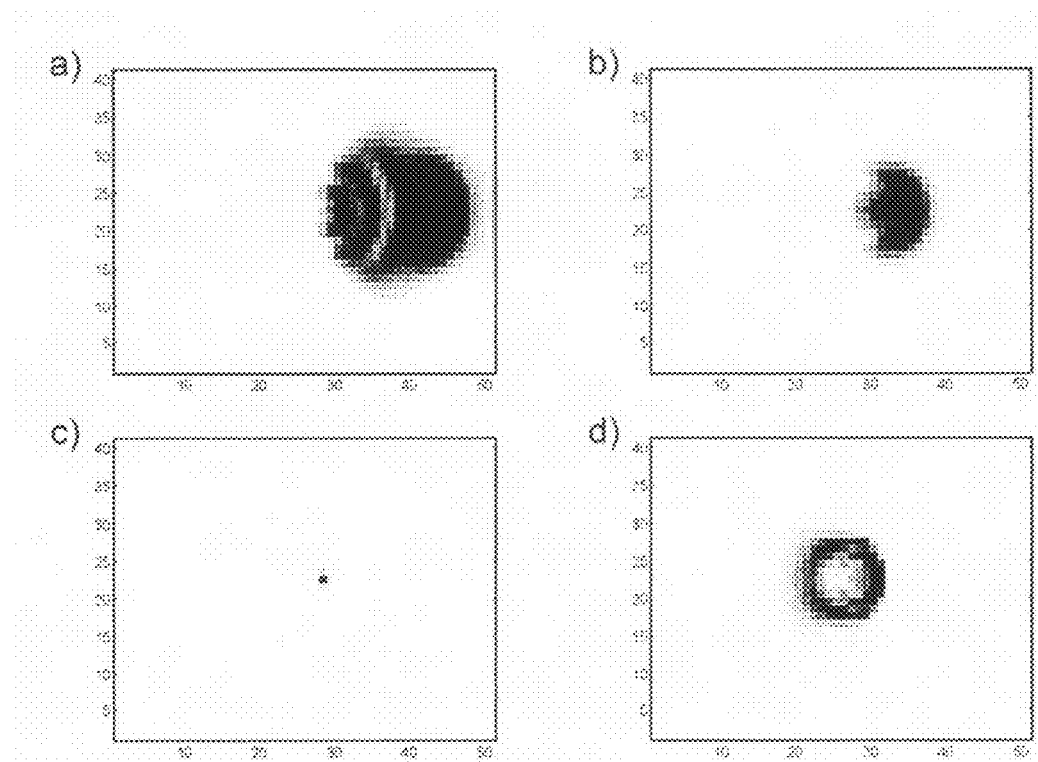

As described with reference to the k-sphere diagram in FIG. 6, the wavelength mismatch causes a 'fan' of reconstructed plane waves. According to a further aspect of the invention the readout reference beam 8' is defocused in order to compensate for the aberrations resulting from wavelength mismatches. In FIG. 9 the diffraction peaks of holograms read with a wavelength mismatch of Δλ=−25 nm are shown for different defocusing values, i.e. different distances $z_{read}$ of the origin of the spherical reference wave. The underlying distances $z_{read}$ are $z_{read}$=480 μm (FIG. 9a)), $z_{read}$=500 μm (FIG. 9b)), $z_{read}$=520 μm (FIG. 9c)), and $z_{read}$=540 μm (FIG. 9d)), which corresponds to offsets from the nominal position of −20 μm, 0 μm, +20 μm, and +40 μm, respectively. The diffraction peak becomes sharp if the focus is adjusted to $z_{read}$=520 m instead of the correct focus where the hologram was recorded, i.e. $z_{read}$=500 μm.

This means that a wavelength mismatch can be corrected by displacing the lens 9 producing the spherical readout reference beam 8' in z-direction. In other words, the beam distortion caused by a wavelength mismatch is corrected by defocusing the readout reference beam 8'. This is preferentially done with the focus servo itself. Additional error signals are preferably generated from the detector image so that the displacement of the lens 9 is automatically adjusted to achieve an optimal peak shape. Of course, also an additional optical element may be used for defocusing.

Figure 10:
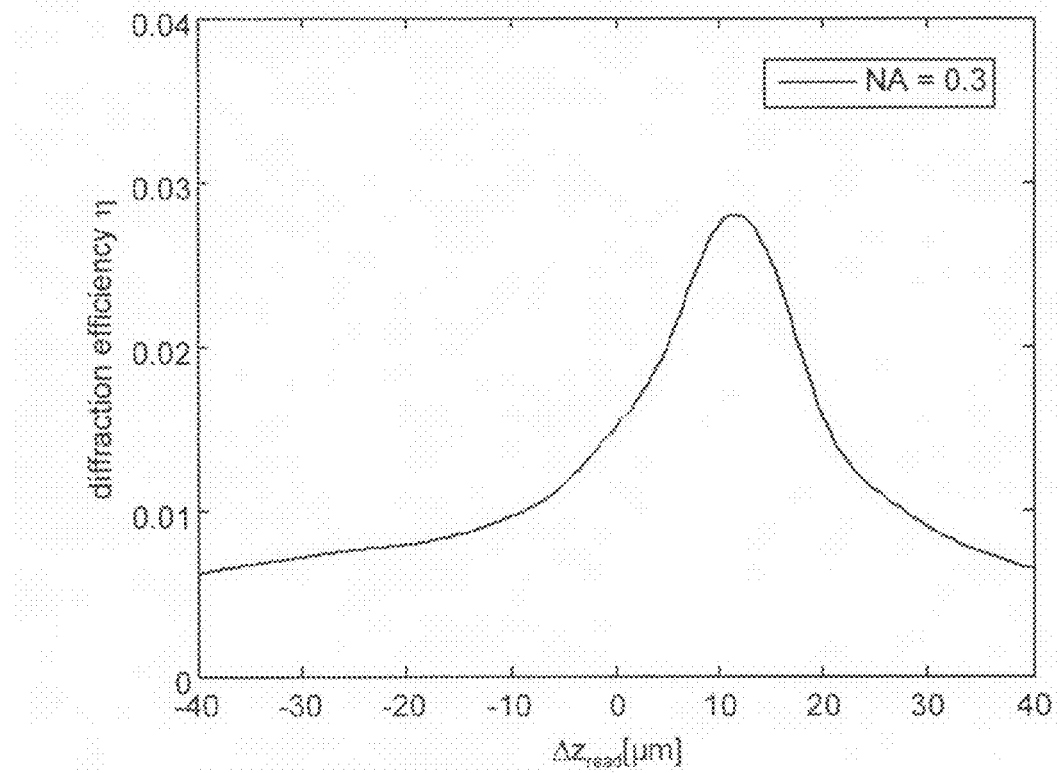
FIG. 10 shows the diffraction efficiency in dependence on the lens shift in z-direction, and FIG. 11 schematically depicts a compensation method according to the invention.

FIG. 10 shows the diffraction efficiency η in dependence on the shift $\Delta z_{read}$ in z-direction. It can be seen that also the total diffraction efficiency η is increased if the wavelength mismatch is compensated by a z-shift of the readout reference beam 8.

Figure 11:
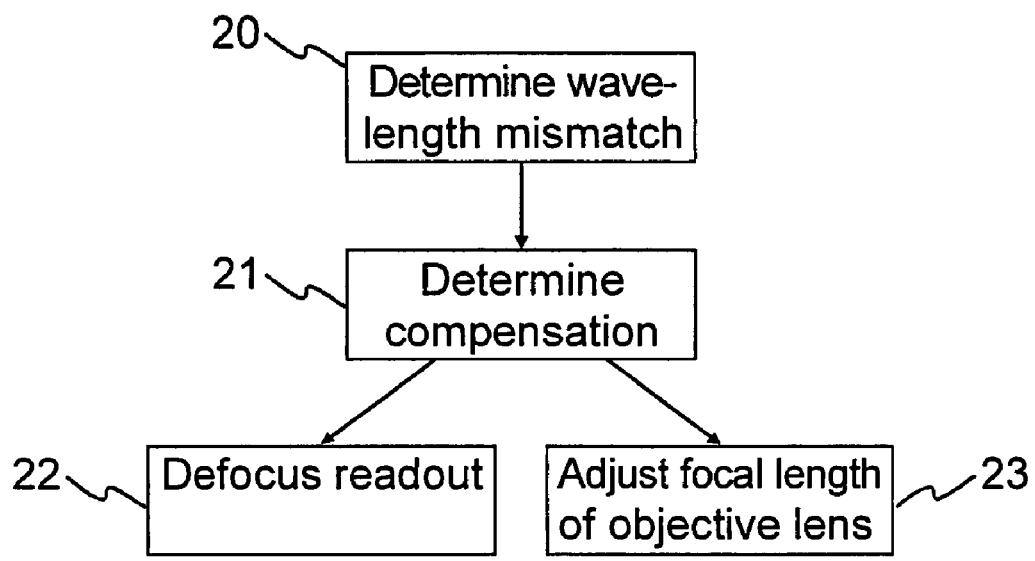

In FIG. 11 a compensation method according to the invention is schematically depicted. In a first step 20 a wavelength mismatch Δλ is determined 20. In the next step 21 the necessary compensation for the determined wavelength mismatch Δλ is determined. The wavelength mismatch Δλ is the compensated by either defocusing 22 the readout reference beam 8' or by adjusting 23 the focal length of the objective lens 9.

What is claimed, is:

1. Method for compensating for a wavelength mismatch between a readout reference beam and a recording reference beam in a holographic storage system, having the steps of:
   determining the wavelength mismatch; and
   adjusting the direction of at least part of the readout reference beam relative to a holographic storage medium in dependence on the determined wavelength mismatch, wherein the direction of the readout reference beam relative to the holographic storage medium is adjusted by defocusing the readout reference beam or by adjusting the focal length of an objective lens for focusing the readout reference beam into the holographic storage medium.

2. Method according to claim 1, wherein a distance between the holographic storage medium and the objective lens is adjusted in accordance with the change of the focal length of the objective lens.

3. Method according to claim 1, wherein the focal length of the objective lens is adjusted by an additional lens with a variable focal length, a telescope, or a diffractive optical element.

4. Method according to claim 1, wherein the objective lens is a lens with a variable focal length.

5. Holographic storage system with a light source for generating a readout reference beam and an objective lens for focusing the readout reference beam into a holographic storage medium, having a wavelength mismatch determination unit for determining a wavelength mismatch between the readout reference beam and a recording reference beam, and a wavelength mismatch correction element for adjusting the direction of at least part of the readout reference beam relative to the holographic storage medium in dependence on the determined wavelength mismatch,
   wherein the wavelength mismatch correction element is adapted to adjust the direction of the readout reference beam relative to the holographic storage medium by defocusing the readout reference beam or by adjusting the focal length of an objective lens for focusing the readout reference beam into the holographic storage medium.

6. Holographic storage system according to claim 5, wherein the wavelength mismatch correction element is a focus servo of the objective lens, an additional lens with a variable focal length, a telescope, or a diffractive optical element.

7. Holographic storage system according to claim 5, wherein the wavelength mismatch correction element is the objective lens.

8. Holographic storage system according to claim 7, wherein the objective lens is a lens with a variable focal length.

* * * * *